United States Patent
Schneider

(10) Patent No.: US 6,721,702 B2
(45) Date of Patent: Apr. 13, 2004

(54) SPEECH RECOGNITION METHOD AND DEVICE

(75) Inventor: Peter Schneider, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/013,231

(22) Filed: Dec. 10, 2001

(65) Prior Publication Data

US 2002/0087324 A1 Jul. 4, 2002

Related U.S. Application Data

(63) Continuation of application No. PCT/DE00/01734, filed on May 29, 2000.

(51) Int. Cl.[7] ............................................. G10L 15/04
(52) U.S. Cl. ........................ 704/251; 704/270; 704/231; 704/243
(58) Field of Search ................................ 704/270–275, 704/251, 240, 231, 243, 235, 260, 239, 256; 434/167, 156, 112

(56) References Cited

U.S. PATENT DOCUMENTS

| | | | | |
|---|---|---|---|---|
| 4,164,025 A | * | 8/1979 | Dubnowski et al. | 715/533 |
| 5,638,425 A | * | 6/1997 | Meador et al. | 379/88.01 |
| 5,752,230 A | | 5/1998 | Alonso-Cedo | |
| 5,909,666 A | * | 6/1999 | Gould et al. | 704/251 |
| 5,920,837 A | * | 7/1999 | Gould et al. | 704/251 |
| 5,983,179 A | * | 11/1999 | Gould | 704/270.1 |
| 6,092,043 A | * | 7/2000 | Squires et al. | 704/251 |
| 6,230,132 B1 | | 5/2001 | Class et al. | |

FOREIGN PATENT DOCUMENTS

GB      2 304 957 A      3/1997

OTHER PUBLICATIONS

Matt Marx et al.: "Putting People First: Specifying Proper Names in Speech Interfaces", Symposium on User Interface Software and Technology, Marina Del Rey, CA, USA, Nov. 2, 1994, pp. 29–37.

Bernhard Kaspar et al.: "Spracherkennung Für Grosses Vokabular Durch Buchstabieren" [speech recognition for large vocabulary by spelling], ITG Fachberichte, VDE Verlag, Berlin, No. 94, Apr. 28, 1986, pp. 31–36.

* cited by examiner

*Primary Examiner*—Vijay Chawan
(74) *Attorney, Agent, or Firm*—Laurence A. Greenberg; Werner H. Stemer; Ralph E. Locher

(57) ABSTRACT

In a method for interactive voice recognition, a word spoken by a user is analyzed. If no definite assignment to a word of a predetermined vocabulary is possible, the word is assigned a number of possible words from the vocabulary. For each word of the preselection of words, a decisive letter that makes the word distinguishable from the other words of the preselection of words is determined. The user is prompted to say the decisive letter for the word being sought. The word being sought is ascertained by voice recognition of the decisive letter.

9 Claims, 2 Drawing Sheets

| Typ \ MOD | WM | BM1 | BM2 |
|---|---|---|---|
| Word / Letter | Padua | d | d |
| Spoken Word / Letter or Alphabet Word | "Padua" | "de" | "Dora" |
| Electrical Voice Signal | S("Padua") | S("de") | S("Dora") |

SPEECH RECOGNITION METHOD AND DEVICE

CROSS-REFERENCE TO RELATED APPLICATION

This application is a continuation of copending International Application No. PCT/DE00/01734, filed May 29, 2000, which designated the United States.

BACKGROUND OF THE INVENTION

Field of the Invention

The invention relates to a method and a device for the voice recognition of a word.

Voice recognition systems are becoming increasingly widespread in many areas of technology.

In the case of dictation systems, voice recognition techniques are used for the automatic creation of written text. Dictation systems of this type are based on the recognition of individual words or syllables. Apart from the word or syllable recognition, they often have a spelling mode, which, if it fails to recognize a word, prompts the user to say the word letter by letter.

Other known voice recognition applications are based from the outset on a letter-by-letter input of a word. Systems of this type are referred to as spelling recognition units. Spelling recognition units are used for example in navigation systems for motor vehicles with voice input of destination information. The navigation system must be able to distinguish between a very large number of to some extent similarly sounding words (names of towns, street names, names of hotels, restaurants and bars, etc.), which can be ensured with adequate certainty by letter-by-letter input of the word. However, it is disadvantageous that a relatively high degree of concentration is required for the spelling, which cannot always be provided when maneuvering a vehicle.

SUMMARY OF THE INVENTION

It is accordingly an object of the invention to provide a voice recognition method and an associated device which overcome the above-mentioned disadvantages of the prior art methods and devices of this general type, which, in the case in which a word is not definitely recognized, proceeds in a word recognition mode through a user-friendly sequence for finding the word being sought.

With the foregoing and other objects in view there is provided, in accordance with the invention, a method for interactive voice recognition of a word by a voice recognition system. The method includes performing a word recognition mode by the steps of: converting a spoken word into an electrical word voice signal; and analyzing the electrical word voice signal for recognizing the spoken word from a vocabulary of predetermined words. The following steps are performed if a definite assignment of the electrical word voice signal to a word from the vocabulary of predetermined words cannot be made: compiling a preselection of words from the vocabulary of predetermined words which have a sufficient probability of being the spoken word; determining for each word forming the preselection of words, at least one decisive letter which makes the word distinguishable from other words in the preselection of words; inquiring which of the decisive letters for the words of the preselection of words is appropriate during a spelling recognition mode; converting a spelling voice input into an assigned electrical spelling voice signal; and analyzing the assigned electrical spelling voice signal for recognizing the decisive letter.

The invention is based on the realization that it is generally not necessary to make the user spell the word not definitely recognized in the word recognition mode from the beginning in the spelling recognition mode. Rather, it is sufficient to make a limited number of words contained in the preselection list distinguishable on the basis of suitably chosen decisive letters and then to determine in the spelling recognition mode the word being sought by specific inquiry of the decisive letter assigned to the word being sought.

In the inquiry of the decisive letter, the decisive letters previously determined with respect to the words of the preselection list are preferably suggested to the user by the voice recognition system, thereby increasing the interactivity of the system.

Although, in principle, the inquiry can also take place visually, for example, in the case of many applications it is expedient to provide an acoustic inquiry.

In practice, it may happen that, on account of suddenly occurring ambient noises or initially indistinct pronunciation by the user, a repetition of the spoken word appears expedient. An advantageous refinement of the method according to the invention is therefore characterized in that the user is prompted to repeat the spoken word if the number of words contained in the preselection list exceeds a predetermined limit value. In the repetition of the word, there may be fewer disturbances through ambient noises and experience shows that the user endeavors to speak more clearly, so that usually a more favorable preselection is available as a result for the following inquiry and spelling recognition steps than in the case of the first attempt.

The spelling recognition mode may be an alphabet-word recognition mode or a letter recognition mode. In the first case, the operator convenience can be increased in an advantageous way by a number of different alphabet words being assigned to an individual letter (for example "Anton", "Alpha", "Alfred" for the letter a). The user then has several possibilities to name a letter in the alphabet-word recognition mode.

With the foregoing and other objects in view there is provided, in accordance with the invention, a device for voice recognition. The device contains a word recognition unit for converting a spoken word into an electrical word voice signal and for analyzing the electrical word voice signal for recognizing a word from a vocabulary of predetermined words. A selection logic is provided, which, if a definite assignment of the electrical word voice signal to the word of the vocabulary of predetermined words cannot be made, compiles a preselection of words from the vocabulary of predetermined words among which the spoken word is located with sufficient certainty. The selection circuit is coupled to the word recognition unit. A logic circuit is provided for determining for each word of the preselection of words, at least one decisive letter which makes the word distinguishable from other words of the preselection of word. The logic circuit is coupled to the word recognition unit. An output unit is provided for outputting the decisive letter for each of the words of the preselection of words. The output unit is coupled to the word recognition unit, and a spelling recognition unit for converting a spelling voice input into an associated electrical spelling voice signal, is provided. The spelling recognition unit also analyzes the associated electrical spelling voice signal for recognizing the decisive letter. The spelling recognition unit is connected to the word recognition unit.

The device according to the invention is used with particular advantage in a navigation system for a vehicle, in particular a motor vehicle, since the attention of the driver is distracted from the road traffic only to very small degree on account of the simple procedure for inputting destination information into the system.

Other features which are considered as characteristic for the invention are set forth in the appended claims.

Although the invention is illustrated and described herein as embodied in a voice recognition method and an associated device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1, 3:
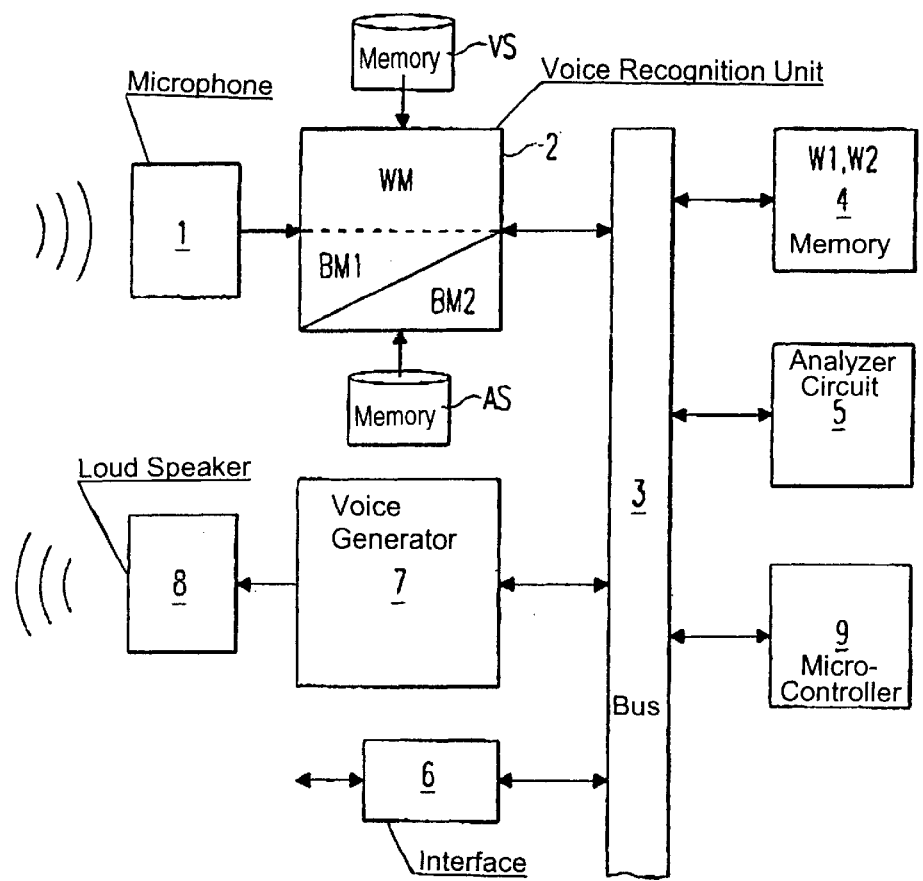
FIG. 1 is a block diagram of a voice recognition device according to the invention.
FIG. 3 is a table for explaining a word recognition mode and two spelling recognition modes.

Referring now to the figures of the drawing in detail and first, particularly, to FIG. 1 thereof, there is shown an example of a device for carrying out the method according to the invention. A microphone/amplifier configuration 1 is followed downstream by a voice recognition unit 2, which can be operated both in a word recognition mode (WM) and in a spelling recognition mode (BM1 or BM2). An output of the voice recognition unit 2 is in a bi-directional connection with a data and control bus 3. Also connected to the data and control bus 3 are a word memory 4, an analyzer/decision circuit 5, an interface 6 and a voice generator 7. An output of the voice generator 7 is in connection with an amplifier/loudspeaker configuration 8. A microcontroller 9 is likewise connected to the data and control bus 3 and serves for sequencing control of the entire system.

The voice recognition unit 2 has access to a vocabulary memory VS, in which the words to be recognized and their assigned sound patterns are stored in the form of reference voice signals. Furthermore, the voice recognition unit 2 accesses an alphabet memory AS, in which the letters of the alphabet and their assigned sound patterns (in the form of a word alphabet and/or in the form of spoken letters) are likewise stored as reference voice signals. In both cases, the sound patterns can be trained by the user, creating a user-adapted voice recognition. The vocabulary memory VS may be, for example, an exchangeable CD-ROM. Both memories VS, AS may also be in connection with the voice recognition unit 2 via the data and control bus 3.

Figure 2:
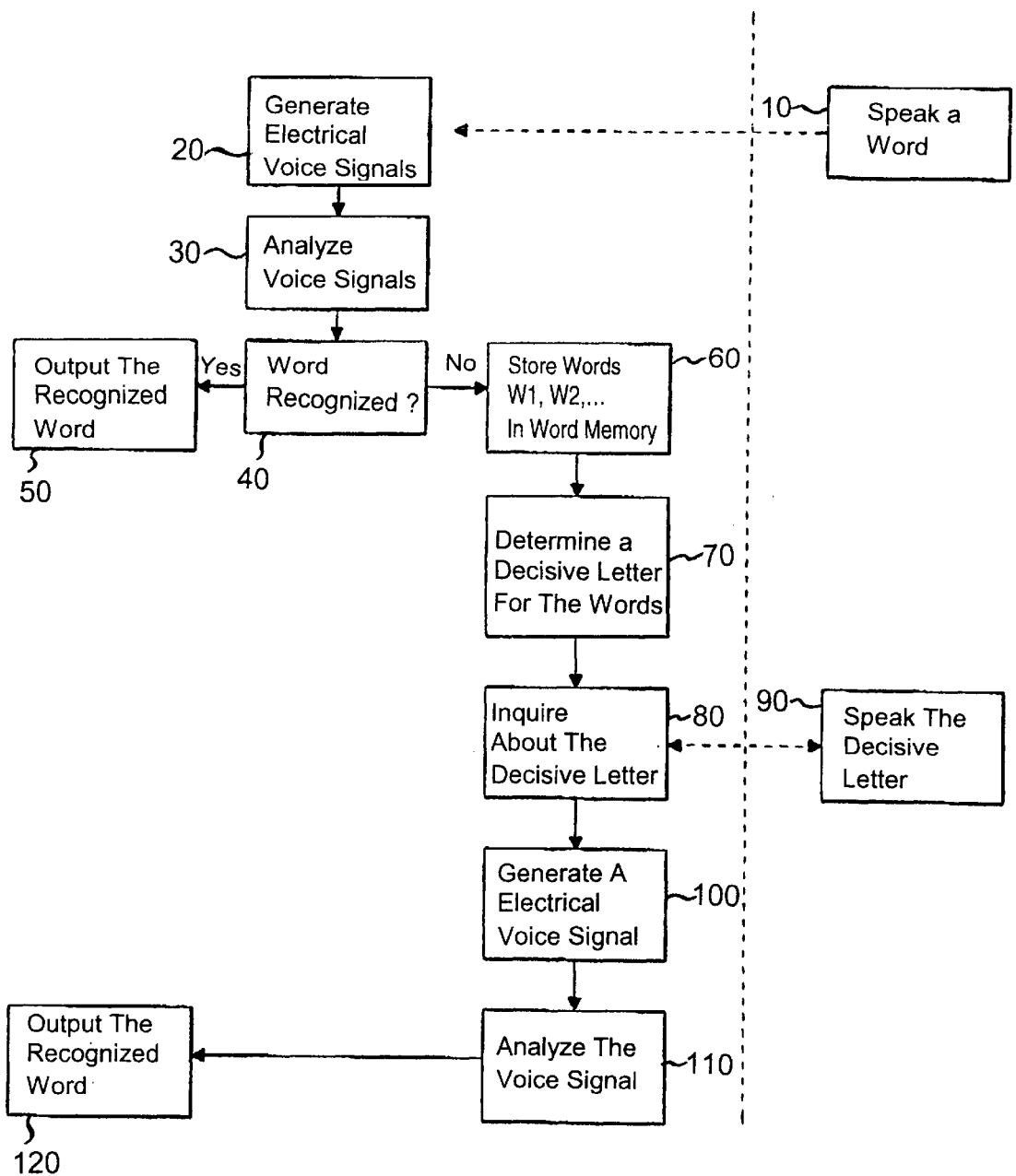
FIG. 2 is a flow chart explaining by way of example a sequence of method steps according to the invention.

The sequence of the interactive voice recognition according to the invention is explained by way of example on the basis of FIGS. 2 and 3.

The voice recognition unit 2 is initially in the word recognition mode WM. The user speaks a word to be recognized, step 10 (FIG. 3), for example "Padua" for the Italian town of Padua.

On the basis of the spoken word "Padua", an electrical voice signal S ("Padua") is generated by the microphone/amplifier configuration 1, step 20.

The electrical voice signal S ("Padua") is subsequently analyzed in the voice recognition unit 2 for the recognition of the word on which the voice signal is based, step 30. To analyze the electrical voice signal S ("Padua"), a correlator may be used, comparing the electrical voice signal S ("Padua") with the reference voice signals (sound patterns) stored in the vocabulary memory VS.

A word W1 for which the reference voice signal has the greatest correlation with the electrical voice signal S ("Padua") obtained is determined from the vocabulary memory VS as the recognized word. Furthermore, it is ascertained with what certainty or probability the recognition is correct. The latter can take place for example by the calculation of reliability information or a confidence number P(W1), which represents a measure of the correctness of the recognition (i.e. Padua=W1).

The confidence number P(W1) can be generated in a variety of ways. For example, it can be formed in dependence on the absolute value of the correlation of the electrical voice signal S ("Padua") with the reference voice signal of the recognized word W1 and/or in dependence on a distance between the maximum correlation value (with respect to the recognized word W1) and the next-smaller correlation value (with respect to the nearest sounding word W2 from the vocabulary). While the former is a measure of the absolute "sound match", the latter is a measure of the "risk of confusion" between W1 and W2.

With a high absolute "sound match" and low "risk of confusion" (other parameters can also be used as well), a correct word recognition can be assumed with a high degree of probability, step 40. In this case, the system assumes that the spoken word has been correctly recognized and outputs the recognized word W1 as the result, step 50. The user is offered the opportunity by acoustic devices, for example via the voice generator 7 and the amplifier/loudspeaker configuration 8, or by an optical device, via a display, to check the recognition result (W1) and, if appropriate, indicate it to the system as a correct or incorrect recognition.

However, there often occurs the case in which two or more words W1, W2, . . . of the vocabulary come into consideration as the recognition result according to the analysis described above, i.e. a definite assignment is not achieved with adequate certainty in the correlation step.

In this case, the words W1, W2, . . . found are stored in the word memory 4 as a preselection list under the control of the microcontroller 9, step 60. The associated reliability numbers P(W1), P(W2), . . . may also be stored in the word memory 4.

In a next step, a decisive letter contained in the corresponding word is determined for each word W1, W2, . . . found, step 70. The determination of the decisive letters takes place by comparison of the words W1, W2, . . . in the analyzer/decision circuit 5.

For example, let W1 be the word being sought, Padua, and W2 be the similarly sounding word Pavia. The two words W1, W2 are identical in the first two letters and in the last letter, but can be distinguished from each other on the basis of their third or fourth letters. Consequently, Padua is assigned the decisive letter d (or else u) and Pavia is assigned the decisive letter v (or else i). If—as in the present case—there are a number of possibilities for the determination of a decisive letter, it may be provided that decisive letters sounding as different as possible from one another are selected.

The voice recognition unit 2 is subsequently switched over into a spelling mode (BM1 or BM2) and an inquiry of the decisive letter for each word W1, W2, . . . found takes place.

The inquiry may take place by an acoustic method via the voice generator 7 and the amplifier/loudspeaker configuration 8. In the letter recognition mode BM1, the recognition problem can be explained to the user for example by a voice output, in that he is offered the following alternative options: "say "dee" for Padua or "vee" for Pavia", step 80. In a corresponding way, in the word-alphabet recognition mode BM2, the prompt may be: "say "Dora" for Padua or "Viktor" for Pavia".

The prompt to name the correct decisive letter can also take place by optical methods, for example in that a list of the words W1, W2, . . . found is shown by a display and the decisive letters determined by the analyzer/decision circuit 5 are brought to the attention of the user by flashing or other optical measures.

In the next step 90, the user responds to the inquiry by speaking the decisive letter assigned to the correct word W1, that is "dee" (in the letter recognition mode BM1) or "Dora" (in the alphabet-word recognition mode BM2).

The spoken letter is converted into an electrical voice signal S ("dee") or S ("Dora") by of the microphone/amplifier configuration 1. The electrical voice signal is subsequently analyzed by a correlator in the voice recognition unit 2 for the recognition of the letter d on which the voice signal is based, step 110. In this case, reference voice signals (sound patterns), stored in the alphabet memory AS, of the corresponding spoken letters or alphabet words are compared with the electrical voice signal S ("dee") or S ("Dora").

In an optional, final step 120, it may be provided that the word W1=Padua then identified is announced to the user by the voice generator 7 and the amplifier/loudspeaker configuration 8, or shown on the display, for confirmation. In the case of confirmation by the user, the system (for example motor-vehicle navigation system or computer) is notified of the word W1 by the interface 6, so that the system can then initiate control measures dependent on the word recognized.

I claim:

1. A method for interactive voice recognition of a word by a voice recognition system, which comprises the steps of:
   performing a word recognition mode by the steps of:
      converting a spoken word into an electrical word voice signal;
      analyzing the electrical word voice signal for recognizing the spoken word front a vocabulary of predetermined words;
   performing the following steps if a definite assignment of the electrical word voice signal to a word from the vocabulary of predetermined words cannot be made:
      compiling a preselection of words from the vocabulary of predetermined words which have a sufficient probability of being the spoken word;
      determining for each word forming the preselection of words, at least one decisive letter which makes the word distinguishable from other words in the preselection of words;
      inquiring which of the decisive letters for the words of the preselection of words is appropriate during a spelling recognition mode;
      converting a spelling voice input into an assigned electrical spelling voice signal; and
      analyzing the assigned electrical spelling voice signal for recognizing the decisive letter.

2. The method according to claim 1, which comprises during the inquiring step, suggesting the decisive letters previously determined to a user using the voice recognition system.

3. The method according to claim 2, which comprises performing the suggesting step acoustically.

4. The method according to claim 1, which comprises prompting a user to repeat the spoken word it a number of words contained in the preselection of words exceeds a predetermined limit value.

5. The method according to claim 1, which comprises performing the spelling recognition mode as an alphabet-word recognition mode.

6. The method according to claim 5, which comprises using at least one of user defined alphabet words and a number of alphabet words for identifying the letters.

7. The method according to claim 1, which comprises using the spelling recognition mode as a letter recognition mode.

8. A device for voice recognition, comprising:
   a word recognition unit for converting a spoken word into an electrical word voice signal and analyzing the electrical word voice signal for recognizing a word from a vocabulary of predetermined words;
   a selection logic, which, if a definite assignment of the electrical word voice signal to the word of the vocabulary of predetermined words cannot be made, compiles a preselection of words from the vocabulary of predetermined words among which the spoken word is located, said selection circuit coupled to said word recognition unit;
   a logic circuit for determining for each word of the preselection of words, at least one decisive letter which makes the word distinguishable from other words of the preselection of words, said logic circuit coupled to said word recognition unit;
   an output unit for outputting the decisive letter for each of the words of the preselection of words, said output unit coupled to said word recognition unit; and
   a spelling recognition unit for converting a spelling voice input into an associated electrical spelling voice signal, and for analyzing the associated electrical spelling voice signal for recognizing of the decisive letter, said spelling recognition unit connected to said word recognition unit.

9. A navigation system, comprising:
   a device for voice recognition, including:
      a word recognition unit for converting a spoken word into an electrical word voice signal and analyzing the electrical word voice signal for recognizing a word from a vocabulary of predetermined words;
      a selection logic, which, it a definite assignment of the electrical word voice signal to the word of the vocabulary of predetermined words cannot be made, compiles a preselection of words from the vocabulary of predetermined words among which the spoken word is located, said selection circuit coupled to said word recognition unit;

a logic circuit for determining for each word of the preselection of words, at least one decisive letter which makes the word distinguishable from other words of the preselection of word, said logic circuit coupled to said word recognition unit;

an output unit for outputting the decisive letter for each of the words of the preselection of words, said output unit coupled to said word recognition unit; and a spelling recognition unit for converting a spelling voice input into an associated electrical spelling voice signal, and for analyzing the associated electrical spelling voice signal for recognizing of the decisive letter, said spelling recognition unit connected to said word recognition unit.

* * * * *

UNITED STATES PATENT AND TRADEMARK OFFICE
CERTIFICATE OF CORRECTION

PATENT NO. : 6,721,702 B2
DATED : April 13, 2004
INVENTOR(S) : Peter Schneider

It is certified that error appears in the above-identified patent and that said Letters Patent is hereby corrected as shown below:

<u>Title page,</u>
Item [30], Foreign Application Priority Data, should read as follows:
-- Jun. 10, 1999      (DE)      ……… 199 26 468 --

Signed and Sealed this

Eighth Day of June, 2004

JON W. DUDAS
*Acting Director of the United States Patent and Trademark Office*